United States Patent
Claus et al.

(10) Patent No.: US 6,751,284 B1
(45) Date of Patent: Jun. 15, 2004

(54) METHOD AND SYSTEM FOR TOMOSYNTHESIS IMAGE ENHANCEMENT USING TRANSVERSE FILTERING

(75) Inventors: Bernhard Erich Hermann Claus, Niskayuna, NY (US); Jeffrey Wayne Eberhard, Albany, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/309,301

(22) Filed: Dec. 3, 2002

(51) Int. Cl.$^7$ .............................................. G01N 23/083
(52) U.S. Cl. ............................ 378/22; 378/21; 378/901
(58) Field of Search ............................ 378/21, 22, 901

(56) References Cited

U.S. PATENT DOCUMENTS 4,081,673 A * 3/1978 Swindell et al. ......... 250/237 R
4,903,204 A    2/1990 Dobbins, III
2003/0194049 A1   10/2003 Claus et al. .................. 378/22

OTHER PUBLICATIONS

Bernhard E.H. Claus, et al., A New Method for 3D Reconstruction In Digital Tomosynthesis; Proc. SPIE vol. 4684, Medical Imaging 2002—Image Processing, 2002.
A.C. Kak, Principles of Computerized Tomographic Imaging, IEEE Press; Algebraic Reconstruction Algorithms, pp. 275–296, 1988.

* cited by examiner

*Primary Examiner*—David V Bruce
(74) *Attorney, Agent, or Firm*—Fletcher Yodar, P.C.

(57) ABSTRACT

A technique is provided for reducing contrast variability in images produced by tomosynthesis. In particular, contrast variability in images produced by a radiation source which has a linear or elongated scan path is reduced. The technique filters the radiographic projections or the reconstructed image slices in a direction transverse to the scan-direction of the radiation source to reduce contrast variations related to the orientation of the structure and the scan geometry.

60 Claims, 6 Drawing Sheets

METHOD AND SYSTEM FOR TOMOSYNTHESIS IMAGE ENHANCEMENT USING TRANSVERSE FILTERING

BACKGROUND OF THE INVENTION

The present invention relates generally to the field of medical imaging, and more specifically to the field of tomosynthesis. In particular, the present invention relates to minimizing contrast variations in tomosynthetic reconstructions.

Tomographic imaging technologies are of increasing importance in medical diagnosis, allowing physicians and radiologists non-invasively to obtain three-dimensional representations of selected organs or tissues of a patient. Tomosynthesis is a variation of conventional planar tomography in which a limited number of radiographic projections are digitally acquired at different angles relative to the patient. In tomosynthesis, an X-ray source produces a fan or cone-shaped X-ray beam that is collimated and passes through the patient to then be detected by a set of detector elements. The detector elements produce a signal based on the attenuation of the X-ray beams. The signals may be processed to produce a radiographic projection, comprising generally the line integrals of the attenuation coefficients of the object along the ray path. The source, the patient, or the detector are then moved relative to one another for the next exposure, typically by moving the X-ray source, so that each projection is acquired at a different angle.

By using reconstruction techniques, such as filtered backprojection, the set of acquired projections may then be reconstructed to produce diagnostically useful three-dimensional images. Because the three-dimensional information is obtained digitally during tomosynthesis, the image can be reconstructed in whatever viewing plane the operator selects. Typically, a set of slices representative of some volume of interest of the imaged object is reconstructed, where each slice is a reconstructed image representative of structures in a plane that is parallel to the detector plane, and each slice corresponds to a different distance of the plane from the detector plane.

In addition, because tomosynthesis reconstructs three-dimensional data from projections, it provides a fast and cost-effective technique for removing superimposed anatomic structures and for enhancing contrast in in-focus planes as compared to the use of a single X-ray radiograph. Further, because the tomosynthesis data consists of relatively few projection radiographs that are acquired quickly, often in a single sweep of the X-ray source over the patient, the total X-ray dose received by the patient is comparable to the dose of a single conventional X-ray exposure and is typically less than the dose received from a computed tomography (CT) examination. In addition, the resolution of the detector employed in tomosynthesis is typically greater than the resolution of detectors used in CT examinations. These qualities make tomosynthesis useful for such radiological tasks as detecting pulmonary nodules or other difficult to image pathologies.

Though tomosynthesis provides these considerable benefits, the techniques associated with tomosynthesis also have disadvantages. In particular, the reconstruction problem is difficult to solve because only incomplete information is available due to the nature of the technique. That is, the radiographic projections may be acquired from only a few angles within a relatively narrow angular range and are not densely spaced over the full angular range, limiting the amount of information acquired, Advanced reconstruction algorithms are employed to solve these reconstruction problems. A good reconstruction algorithm provides efficient separation of overlying tissue, minimizes artifacts, and enhances contrast, particularly of small structures.

Reconstructed data sets in tomosynthesis often exhibit a blurring of structures in the direction of the projections that were used to acquire the tomosynthesis data. These artifacts associated with an imaged structure will vary depending on the orientation of the structure with respect to the acquisition geometry. Therefore, the blurring of structures may create undesirable image artifacts and inhibit the separation of structures located at different heights in the reconstruction of the imaged volume.

Systems employing advanced reconstruction algorithms utilizing a re-projection consistency constraint, either directly or indirectly, to obtain high-quality reconstructions attempt to recover the contrast of the imaged structures and to minimize the aforementioned blurring of structures. In algorithms incorporating a re-projection consistency constraint, the degree of contrast which can be recovered and the degree of blurring will vary depending on the algorithm used, the acquisition geometry of the imaging system, and the geometry, position, and orientation of the imaged object or structure. Examples of algorithms incorporating the re-projection consistency constraints include linear/additive ART, matrix inversion tomosynthesis (MITS), volumetric non-linear reconstruction, and generalized filtered backprojection. As can be observed in these algorithms, the contrast recovered and the remaining blur are interdependent. In particular, the re-projection consistency constraint has the effect of keeping constant the total amount of the contrast of the reconstructed structure and the contrast of the blurring artifacts associated with that structure. Hence, the better the reconstruction algorithm is at suppressing blurring, the better the contrast of the reconstructed structure.

However, the shape and extent of the remaining blur is strongly dependent on the shape and orientation of the structure in relation to the specific system geometry used for image acquisition, as discussed above. In particular, if the X-ray source travels along a generally linear trajectory during the imaging: process, a structure that is "long" in a direction generally parallel to the linear path of the source will produce a widespread blur, while a structure that is "short" in a direction generally parallel to the linear path of the source will produce only a localized blur. For example, an elongated structure will produce a widespread blur if it is oriented generally parallel to the linear path of the source, and only a localized blur if it is oriented generally perpendicular to the source trajectory. Due to the aforementioned interdependence between contrast of the reconstructed structure and the remaining blur due to that structure, the contrast of the reconstruction of that same elongated structure is higher if it is oriented generally perpendicular to the source trajectory, and lower if it is oriented generally parallel to the source trajectory.

One manner in which this problem has been indirectly addressed has been to utilize symmetric system geometries, such as in circular tomosythesis, which acquire projections at a number of different orientations relative to each structure orientation. For example, in circular tomosynthesis, the X-ray source is not moved in a linear trajectory, but is instead moved in a circular trajectory in a plane substantially parallel to the plane of the detector. However, in many instances, a less symmetric acquisition geometry may be preferred, for example for reasons of system complexity or scanning speed. For instance, in pulmonary tomosynthesis, a generally linear or an elongated two-dimensional geometry (such as elliptical) may be preferred. An effective method of minimizing contrast variability in reconstructed images while allowing the use of non-symmetric source trajectories, for example linear or elongated acquisition geometries, is therefore needed.

BRIEF DESCRIPTION OF THE INVENTION

The present technique provides a novel approach to correcting contrast asymmetry in three-dimensional images derived from radiographic projections. Particularly, the technique applies a filter which provides contrast symmetry in the reconstructed image. The technique thereby compensates for contrast variations attributable to acquisition system geometry and subject orientation.

In accordance with one aspect of the technique, a method is provided for processing radiographic image data. Two or more radiographic projections of an imaged object are obtained at two or more corresponding view angles by moving a radiation source relative to an imaged object. The radiographic projections are filtered in a direction that is generally transverse to a scan path of the radiation source. A reconstruction algorithm is applied to the filtered projections to reconstruct one or more reconstructed slices.

In accordance with another aspect of the technique, a method is provided for processing radiographic image data. Two or more radiographic projections of an imaged object are obtained at two or more corresponding view angles by moving a radiation source relative to an imaged object. A reconstruction algorithm is applied to the radiographic projections to reconstruct one or more image slices. The image slices are filtered in a direction transverse to a scan path of the radiation source.

In accordance with a further aspect of the technique, a system is provided for processing radiographic image data. The system includes a radiation source capable of producing a stream of radiation and a control circuit operably coupled to the radiation source. In addition, the system includes a detector capable of detecting the stream of radiation and generating two or more radiographic projections and a motor controller configured to displace at least one of the radiation source, the detector, and a patient platform. A processing circuit operably coupled, to the detector and configured to receive the two or more radiographic projections is also included. The processing circuit is further configured to reconstruct the two or more radiographic projections to form one or more reconstructed slices representative of the structures at the corresponding location within an imaged volume. The processing circuit is further configured to apply at least one complementary filter to at least one of the two or more radiographic projections and the one or more reconstructed slices in a direction that is generally transverse to a scan path of the radiation source. An operator workstation operably couple to the processing circuit is configured to display the one or more reconstructed slices.

In accordance with another aspect of the technique, a system is provided for processing radiographic image data. The system includes a radiation source capable of producing a stream of radiation and a control circuit operably coupled to the radiation source. In addition, the system includes a detector capable of detecting the stream of radiation and generating two or more radiographic projections and a motor controller configured to displace at least one of the radiation source, the detector, and a patient platform. A processing circuit operably coupled to the detector and configured to receive the two or more radiographic projections is also included. The processing circuit is further configured to reconstruct the two or more radiographic projections to form one or more reconstructed slices representative of one or more structures within an imaged volume. The processing circuit includes a means for reducing contrast asymmetry in the one or more reconstructed slices. An operator workstation operably coupled to the processing circuit is configured to display the one or more reconstructed slices.

In accordance with an additional aspect of the technique, a tangible medium for processing radiographic image data is provided. The tangible medium includes a routine for filtering two or more radiographic projections in a direction that is generally transverse to a scan path of a radiation source used to generate the projections. A routine is also included for applying a reconstruction algorithm to the filtered projections to generate one or more reconstructed slices.

In accordance with another aspect of the technique, a tangible medium for processing radiographic image data is provided. The tangible medium includes a routine for applying a reconstruction algorithm to two or more radiographic projections to generate one or more reconstructed slices. A routine is also included for filtering the one or more reconstructed slices in a direction that is generally transverse to a scan path of the radiation source used to generate the projections.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
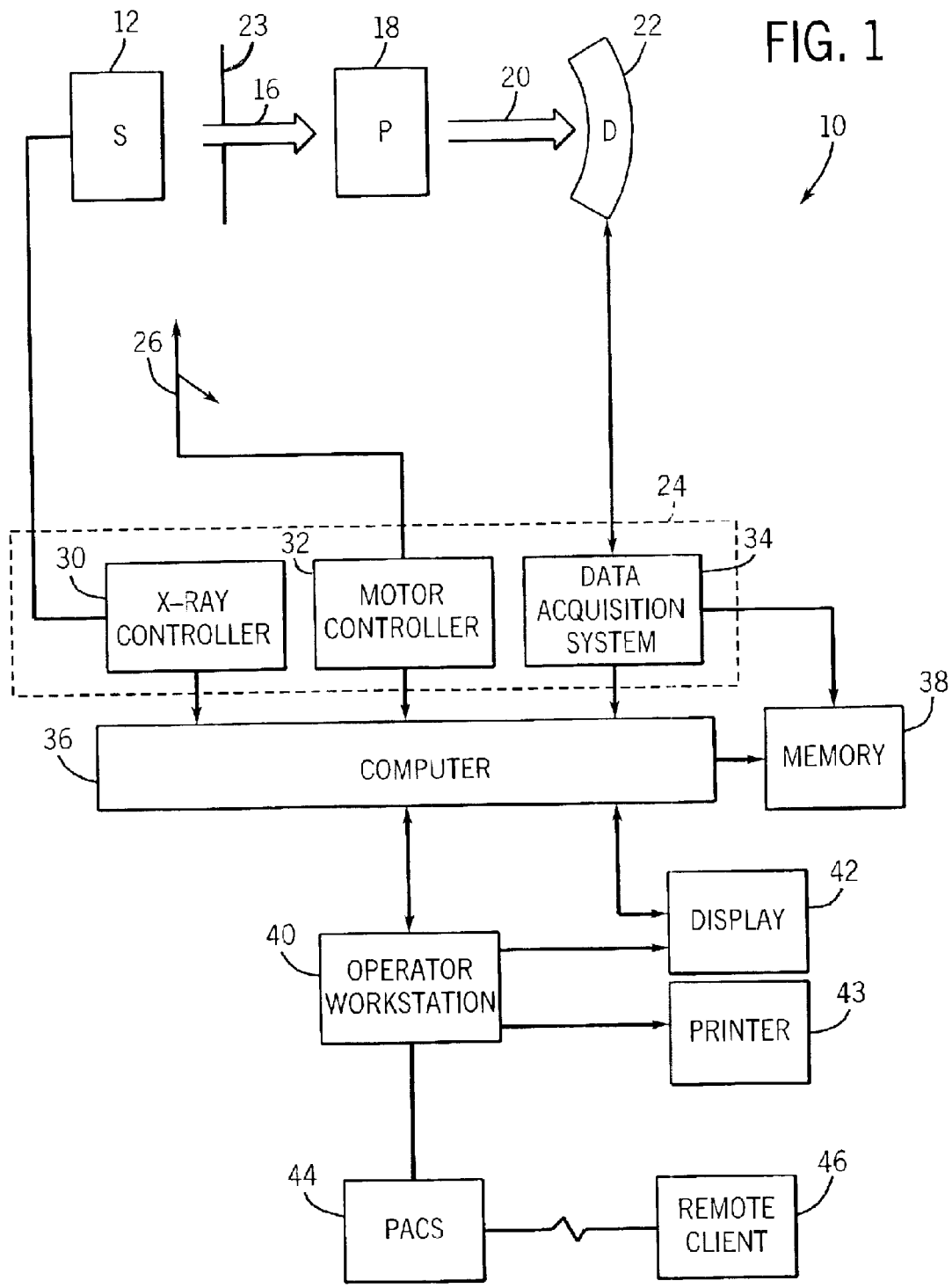
FIG. 1 is a diagrammatical view of an exemplary imaging system in the form of a tomosynthesis imaging system for use in producing processed images in accordance with aspects of the present technique.

FIG. 1 illustrates diagrammatically an imaging system 10 which may be used for acquiring and processing image data.

In the illustrated embodiment, the system 10 is a tomosynthesis system designed both to acquire original image data, and to process the image data for display and analysis in accordance with the present technique. In the embodiment illustrated in FIG. 1, the imaging system 10 includes a source 12 of X-ray radiation which is freely movable generally within a plane. In this exemplary embodiment, the X-ray radiation source 12 typically includes an X-ray tube and associated support and filtering components.

A stream of radiation 16 is emitted by the source 12 and passes into a region in which a subject, such as a human patient 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject. A collimator 23 may define the size and shape of the X-ray beam 16 that emerges from the X-ray source 12.

Source 12 is controlled by a system controller 24 which furnishes both power and control signals for tomosynthesis examination sequences, including positioning of the source 12 relative to the patient 18 and the detector 22. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for, storing programs and routines is executed by the computer, as well as configuration parameters and image data, interface circuits, and so forth.

In the embodiment illustrated in FIG. 1, system controller 24 is coupled to a positional subsystem 26 which positions the X-ray source 12 relative to the patient 18 and the detector 22. In alternative embodiments the positional subsystem 26 may move the detector 22 or even the patient 18 instead of the source 12. In yet another embodiment, more than one component may be movable, controlled by positional subsystem 26. Thus, radiographic projections may be obtained at various angles through the patient 18 by changing the relative positions of the source 12, the patient 18, and the detector 22 via the positional subsystem 26.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the positional subsystem 26.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory adapted to store a large amount of data may be utilized by such an exemplary system 10. Also the computer 36 is configured to receive commands and scanning parameters from an operator via an operator workstation 40, typically equipped with a keyboard and other is input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the image may also be printed on to a printer 43 which may be coupled to the computer 36 and the operator workstation 40. Further, the operator workstation 40 may also be coupled to a picture archiving and communications system (PACS) 44. It should be noted that PACS 44 may be coupled to a remote system 46, radiology department information system (RIS), hospital information system (HIS) or to an internal or external network, so that others at different locations may gain access to the image and to the image data.

It should be further noted that the computer 36 and operator workstation 46 may be coupled to other output devices which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
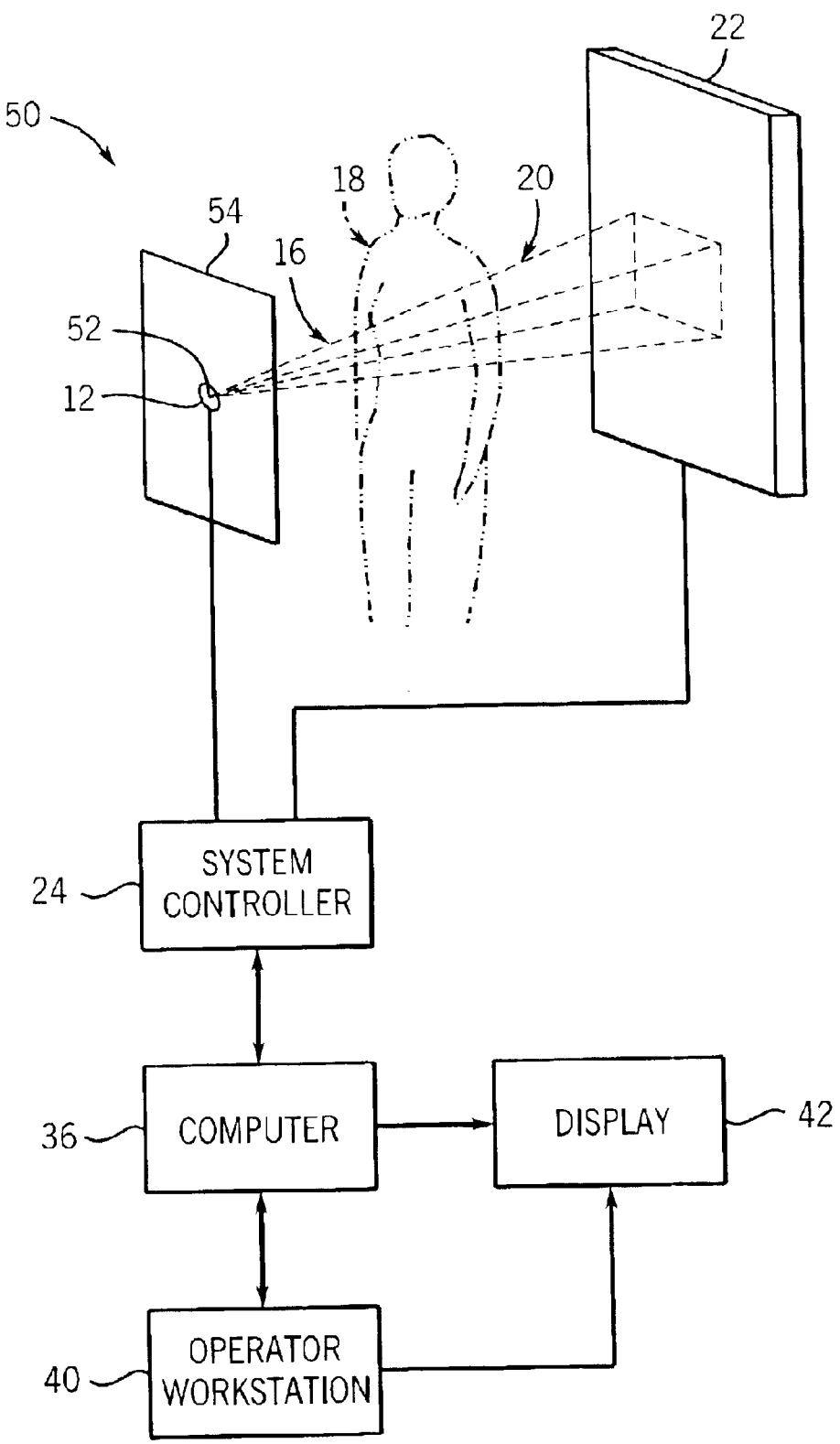
FIG. 2 is a diagrammatical view of a physical implementation of the tomosynthesis system of FIG. 1.

Referring generally to FIG. 2, an exemplary imaging system utilized in a present embodiment may be a tomosynthesis imaging system 50. In an arrangement similar to that described above, the tomosynthesis imaging system 50 is illustrated with a source 12 and a detector 22 between which a patient 18 may be disposed. The source of radiation 12 typically includes an X-ray tube which emits X-ray radiation from a focal point 52. The stream of radiation is directed towards a particular region of the patient 18. It should be noted that the particular region of the patient 18 is typically chosen by an operator so that the most useful scan of a region may be made.

In typical operation, X-ray source 12 projects an X-ray beam from the focal point 52 and toward detector array 22. The detector 22 is generally formed by a plurality of detector elements, generally corresponding to pixels, which sense the X-rays that pass through and around a subject of interest, such as particular body parts, for instance the chest, lungs and so on. In one embodiment, the detector consists of a 2,048×2,048 rectangular array of elements which correspond to a pixel size of 200 $\mu m \times 200$ $\mu m$, though other configurations and sizes of both detector 22 and pixel are of course possible. Each detector element produces an electrical signal that represents the intensity of the X-ray beam at the position of the element at the time the beam strikes the detector. Furthermore, the source 12 may be moved generally within a source plane 54, which is substantially parallel to the plane of the detector 22, so that a plurality of radiographic views from different view angles may be collected by the computer 36. In one embodiment the distance between the source 12 and the detector 22 is approximately 180 cm and the total range of motion of the source 12 is between 31 cm and 131 cm, which translates to ±5° to ±20° where 0° is a centered position. In this embodiment, typically at least 10 projections are acquired, covering the full angular range.

The computer 36 is typically used to control the entire tomosynthesis system 50. The main computer that controls the operation of the system may be adapted to control features enabled by the system controller 24. Further, the operator workstation 40 is coupled to the computer 36 as well as to a display, so that the reconstructed image may be viewed.

As the X-ray source 12 is moved generally within plane 54, the detector 22 collects data of the attenuated X-ray beams. Data collected from the detector 22 then typically undergo pre-processing and calibration to condition the data to represent the line integrals of the attenuation coefficients of the scanned objects. The processed data, commonly called projections, are then typically backprojected to formulate an image of the scanned area. In tomosynthesis, a limited number of projections are acquired, typically twenty or less, each at a different angle relative to the patient and detector. Because tomosynthesis techniques acquire such a limited number of projections which are not densely spaced over the full angular range, the information available for image formulation is limited and the reconstruction problem is therefore difficult. The reconstruction algorithms employed to perform the reconstruction on this limited data efficiently separate tissue layers, minimize artifacts, and enhance image contrast, particularly of small structures. To ensure image quality, reconstruction algorithms may employ a re-projection consistency constraint that requires that an object corresponding to the reconstruction, if exposed to X-rays, reproduce the initial images.

Once reconstructed, the image produced by the system of FIGS. 1 and 2 reveals the three-dimensional relationship of internal features of the patient 18. The image may be displayed to show these features and their three-dimensional relationships. Though the reconstructed image may comprise a single reconstructed slice representative of structures at the corresponding location within the imaged volume, more than one slice is typical.

In traditional approaches to diagnosis of medical conditions, such as disease states, and more generally of medical events, a radiologist or physician would consider a hard copy of the image, produced by the printer 43 or on photographic film, to discern characteristic features of interest. Such features might include nodules, lesions, sizes and shapes of particular anatomies or organs, and other features which would be discernable in the image based upon the skill and knowledge of the individual practitioner. Other analyses may be based upon soft-copy reading, volume rendering of the reconstructed three dimensional dataset, or capabilities of various Computer-Aided Diagnosis or Detection (CAD) algorithms which offer the potential for identifying, or at least localizing, certain features of interest, such as anatomical anomalies. Subsequent processing and data acquisition is then, typically, at the discretion and based upon the expertise of the practitioner.

Localized variations in the contrast of the reconstructed image, however, may impair the analysis of the image by either the practitioner or the CAD algorithm. These contrast variations may arise due to the acquisition geometry, such as non-symmetric source trajectories, in conjunction with the shape and orientation of structures within the imaged volume and due to the reconstruction algorithms employed in reconstruction. In particular, some reconstruction algorithms, particularly those utilizing re-projection consistency constraints, generate reconstructed slices which appear to have been high-pass filtered even in the absence of such a filtering step. However, the perceived filtering by the reconstruction algorithm is only in the direction substantially parallel to the scan path of the source 12. The perceived filtering results in the variations in contrast in the final image which are associated with the shape and orientation of the imaged structures. In particular, reconstructed data sets exhibit a more widespread blurring and a lower contrast for structures that are long in a direction generally disposed parallel to the scan path 56 of the source 12, and a more localized blurring and a higher contrast for structures that are short in a direction generally disposed parallel to the scan path 56 of the source 12.

Figure 3:
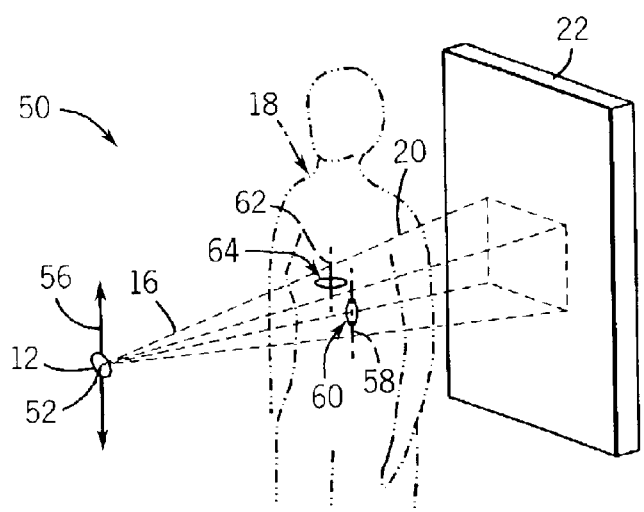
FIG. 3 is another diagrammatical view of a physical implementation of the tomosynthesis system of FIG. 1, in which the X-ray source moves along a linear track.

Because of this perceived filtering caused by the reconstruction algorithm, the acquisition geometry, i.e., the motion of the source 12, and the orientation of the internal structures within the imaging volume, may adversely interact to produce blurring and other artifacts within the image, arid introduce a variation of the structure contrast in the reconstruction. The extent of the variation in contrast and the blurring is proportional to the length of the structure in a direction which is roughly parallel to the scan path of the source 12. This is depicted in FIG. 3, in which the scan path 56 of the source 12 is seen to be generally parallel to the long axis 58 of a first internal structure 60. Conversely, the scan direction 56 is only generally parallel to the short axis 62 of a second internal structure 64. The degree of contrast variation and blurring in the reconstructed final image associated with the long axis 58 and the short axis 62 will be generally linearly proportional to the their respective lengths and the actual orientation of the axes 58 and 62 with respect to the scan path 56. As a consequence, the same structure 60 will exhibit a far lower contrast in the reconstruction if its long axis is substantially parallel to the scan path 56 than if it is transverse (e.g., substantially perpendicular) thereto. That is, the orientation of a structure in the image volume at least partially determines the contrast observed for that structure in the reconstructed image. Due to this relationship, linear or elongated scan paths yield reconstructed images with contrast and blur artifacts associated with those internal dimensions in a direction which is substantially parallel to the scan path 56.

Figure 4:
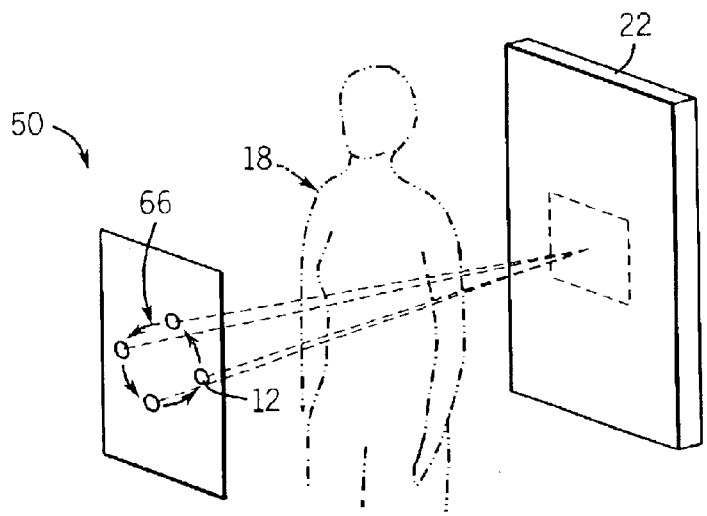
FIG. 4 is a view of the system of FIG. 2, in which the X-ray source is seen to move in a rotationally symmetric manner relative to the imaged anatomy.
Figure 5:
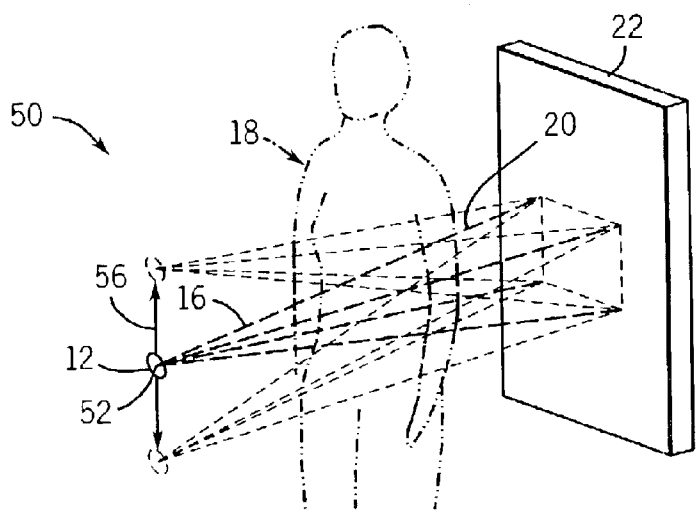
FIG. 5 is a view of a tomosynthesis system of FIG. 3 in which the X-ray source is seen to obtain exposures at different locations along the linear track.

The use of non-elongated or circular symmetric scan paths, such as the circular path 66 depicted in FIG. 4, reduces the contrast variation associated with scan path and structure shape and orientation. However, the use of non-elongated or circular symmetric scan paths may not always be desired in terms of system simplicity and construction or in terms of scan speed. Indeed, a tomosynthesis system 50 which limits the source 12 to a linear scan path 56, such as that depicted in FIG. 5, may be particularly desirable for reasons of system simplicity.

For purposes of illustration, the linear scan paths 56 have been discussed and illustrated as occurring within a generalized source plane 54. However, more general source trajectories can also be used. For example, a non-planar source trajectory that is substantially linear relative to an imaged structure, such as an arc, may also be used. Indeed, any general three-dimensional source trajectory may be utilized in accordance with the present technique.

Figure 6:
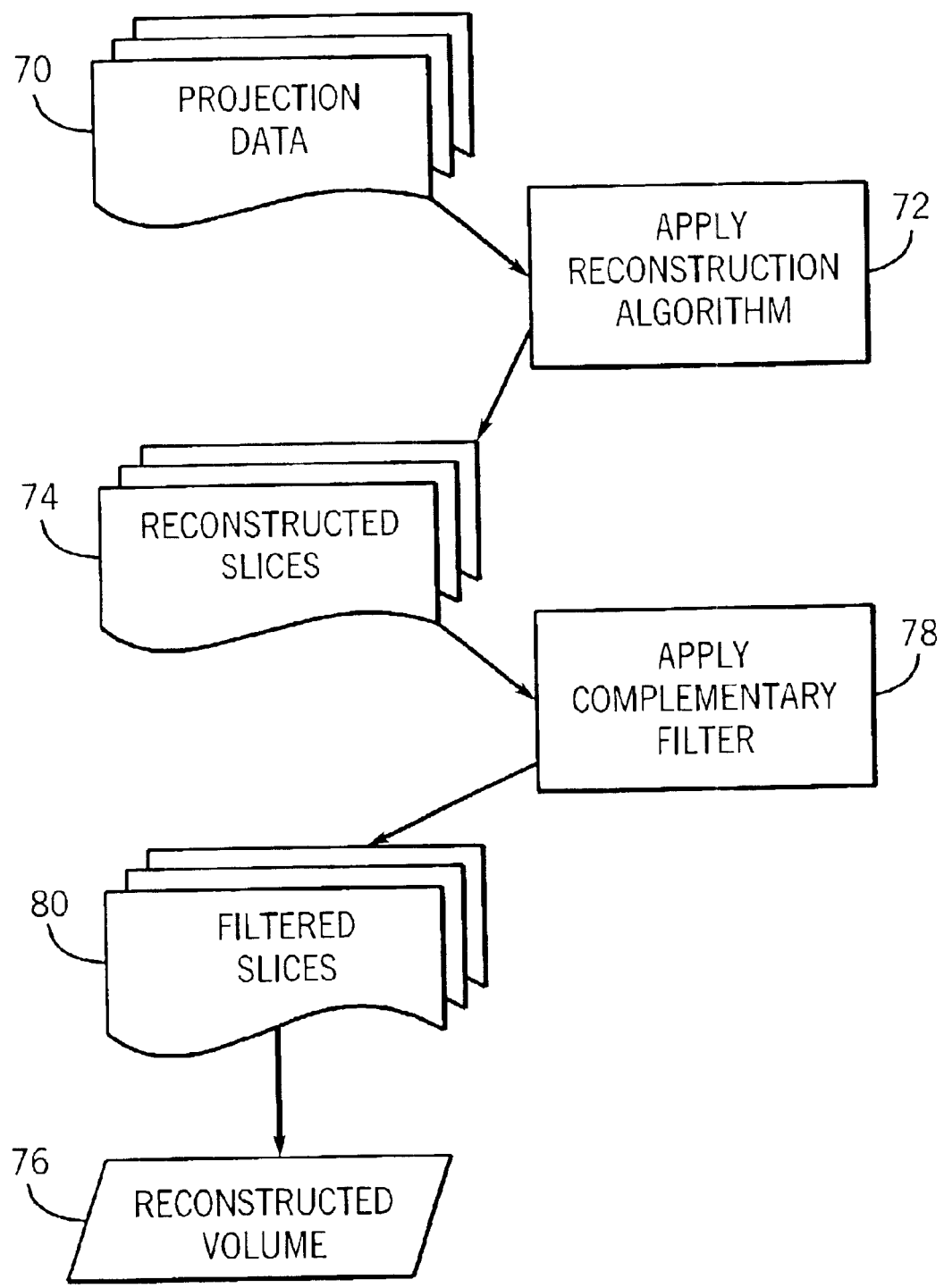
FIG. 6 is a state transition diagram depicting the formation of a reconstructed image volume from projection data according to one embodiment of the present technique.

Referring now to FIG. 6, a method for addressing the contrast asymmetry due to the perceived filtering effect produced by the reconstruction algorithms will be discussed in greater detail. As depicted in FIG. 6, the acquired projection data 70 are processed by applying a reconstruction algorithm 72: The reconstruction process produces reconstructed slices 74 which together constitute a reconstructed image volume 76. To address the perceived contrast asymmetry introduced by the reconstruction algorithm, a complementary filter or a combination of filters constituting a complementary filter may be applied to the reconstructed slices 74, as indicated at reference numeral 78. Application of the complementary filter results in filtered slices 80 which do not possess the contrast asymmetry produced by application of the reconstruction algorithm alone.

In one embodiment, the complementary filter may be an asymmetric linear filter which is generally high-pass in character. In this embodiment, the complementary filter may act in only one direction, such as transverse to the scan path 56 of the source 12. Because of the combined effects of the perceived high-pass filtering introduced by the reconstruction algorithm and of the complementary filter, the filtered slices 80 appear to be filtered in two generally orthogonal directions, i.e., parallel to and transverse to the scan path 56 of the source 12. Custom filters may be used as the complementary filter, as well as known linear filters, such as a Butterworth filter. Where custom filters are employed, they may be designed to complement the apparent filtering introduced by reconstruction such that the resulting filtered slices 80 are substantially symmetric in appearance. For example, a one-dimensional filter that approximates the apparent high-pass filter characteristics of the reconstructed slice can be applied to the reconstructed slices 74 in a direction transverse, e.g. substantially perpendicular, to the scan path 56 to provide the desired symmetric character to the filtered slices 80.

Additionally, the complementary filter may be chosen or designed such that the resulting filtered slices 80 appear to have been filtered with a rotationally symmetric filter. In particular, a suitable complementary filter can be designed in the Fourier domain, which results in a rotationally symmetric filtering characteristic. For example, the two-dimensional Fourier transform of a rotationally symmetric filter or signal is rotationally symmetric. Therefore, in the Fourier domain, one can easily derive a rotationally symmetric counterpart of a one-dimensional filter which approximates the filtering characteristics introduced by the reconstruction algorithm. Because a sequence of linear filtering steps is equivalent to multiplying their respective Fourier transforms, the resulting two-dimensional Fourier transform can be used to derive a two-dimensional filter or combination of one-dimensional filters. This derived filter or filters constitute the complementary filter which, in combination with the perceived reconstruction filtering effect, produce filtered slices 80 that appear to have been filtered by a rotationally symmetric filter. The rotationally symmetric filtering effect has the particular benefit of equally enhancing the contrast of structures at any orientation.

In addition to the linear filters discussed above, non-linear and adaptive filters may also be employed as the complementary filter. For example, median filters may be employed as complementary filters and may have the advantage of removing image noise while retaining edge information. Similarly, complementary filters may be designed based upon order statistics or robust statistics which have a high-pass character and which can enhance structures of a given size, such as small structures, or of a given shape. Likewise, other types of non-linear filters, such as polynomial filters, can be used as complementary filters.

Similarly, the complementary filtering steps in the process may consist of a multiscale filtering method which acts as a high-pass filter. The multiscale filtering method may be used to selectively enhance image structures of a given size. Multiscale filtering methods may include wavelet transforms, wavelet packet transforms, Laplacian pyramid representations, as well as other methods that can be developed using appropriate smoothing filters at different scales, and linear combinations of such filters. The multiscale filter methods in general can be used to decompose an image into a sequence of images of different scale, and the original image can be obtained by recombining the images at different scales in a suitable way. By introducing different weighting factors in the recombination process, one obtains a similar image as the original image, where structures at different scales appear to be enhanced or suppressed.

In selecting an appropriate complementary filter, factors such as the specific characteristics of the reconstruction filtering effect, such as impulse response, may be considered. These characteristics may vary with the specific system geometry used during image acquisition, particularly the angular range over which projections were acquired. In addition, filter selection may consider such factors as computational speed, implementation in the spatial or frequency domain, denoising characteristics of filters, and the desirability of special high-pass filters such as unsharp masking filters. In addition to the linear, non-linear, and multi-scale filtering methodologies discussed above, other types of filters which complement the perceived filter effect introduced during reconstruction 72 to improve the contrast symmetry in filtered slices 80 are suitable complementary filters.

Figure 7:
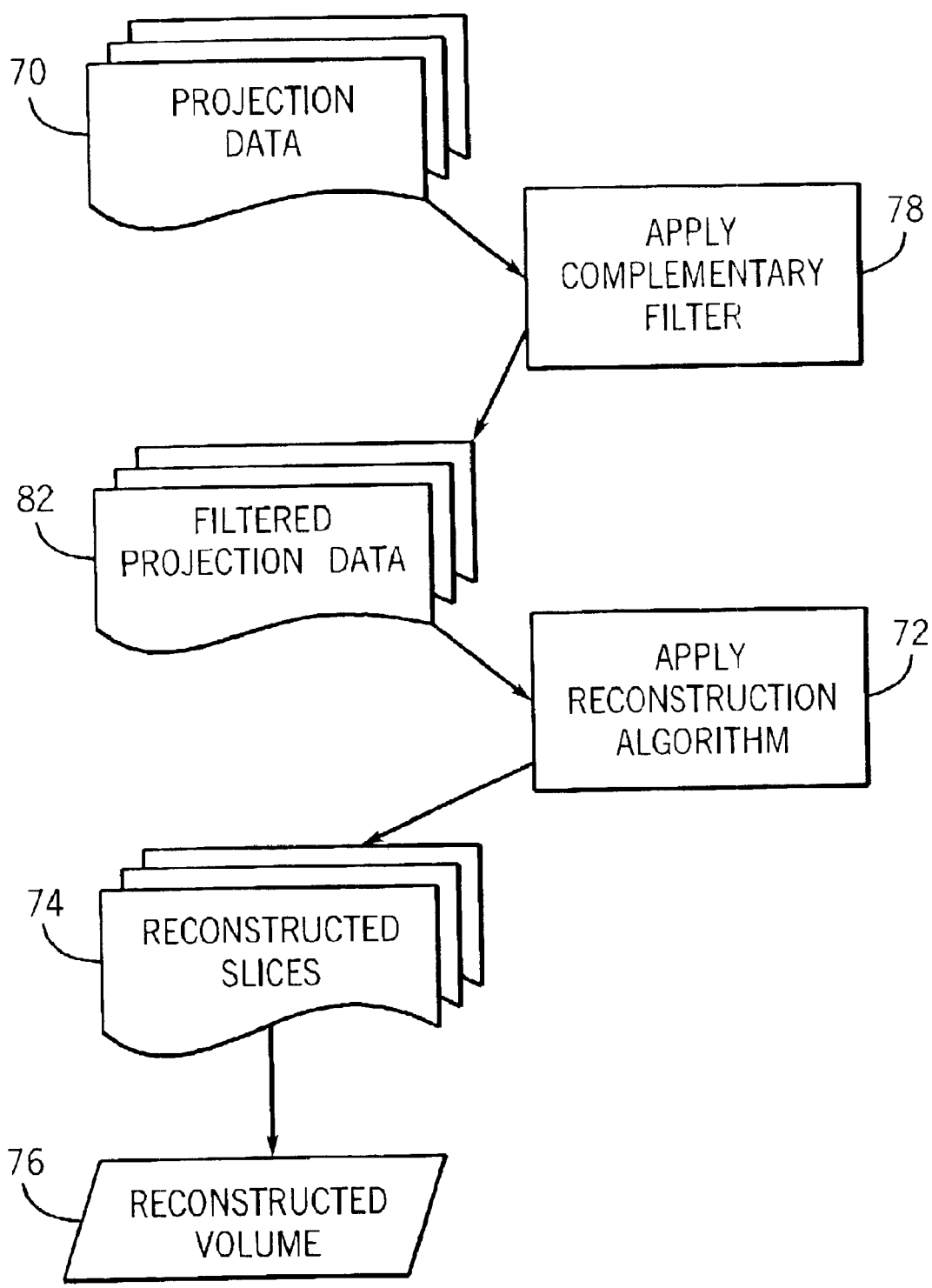
FIG. 7 is a state transition diagram depicting the formation of a reconstructed image volume from projection data according to a another embodiment of the present technique.

While application of the complementary filter 78 to the reconstructed slices 74 is one method of improving contrast symmetry in the reconstructed slices, an alternative method is depicted in FIG. 7. In the method of FIG. 7, the complementary filter 78 is applied to the projection data 70 as opposed to the reconstructed slices 74. A filtered projection data set 82 results from the application of the complementary filter to the projection data 70, and it is this filtered projection data 82 to which the reconstruction algorithm is applied 72. Reconstructed slices 74 are thereby formed which constitute the reconstructed volume 76. To the extent that the reconstruction process and the complementary filtering process are both linear in nature, it is arbitrary whether the step of applying the complementary filer 78 occurs prior or subsequent to the application of the reconstruction algorithm 72. For computational reasons, however, it may be advantageous to apply the complementary filter 78 to the projection data 70 as opposed to the reconstructed slices 74. In particular, because the number of projections is typically less than the number of reconstructed slices, it is generally more computationally efficient to filter the projections. Furthermore, since some reconstruction algorithms consist of a filtering step followed by a backprojection step, it may be computationally advantageous to integrate the filtering that is part of the reconstruction and the complementary filter into a single filtering step.

Figure 8:
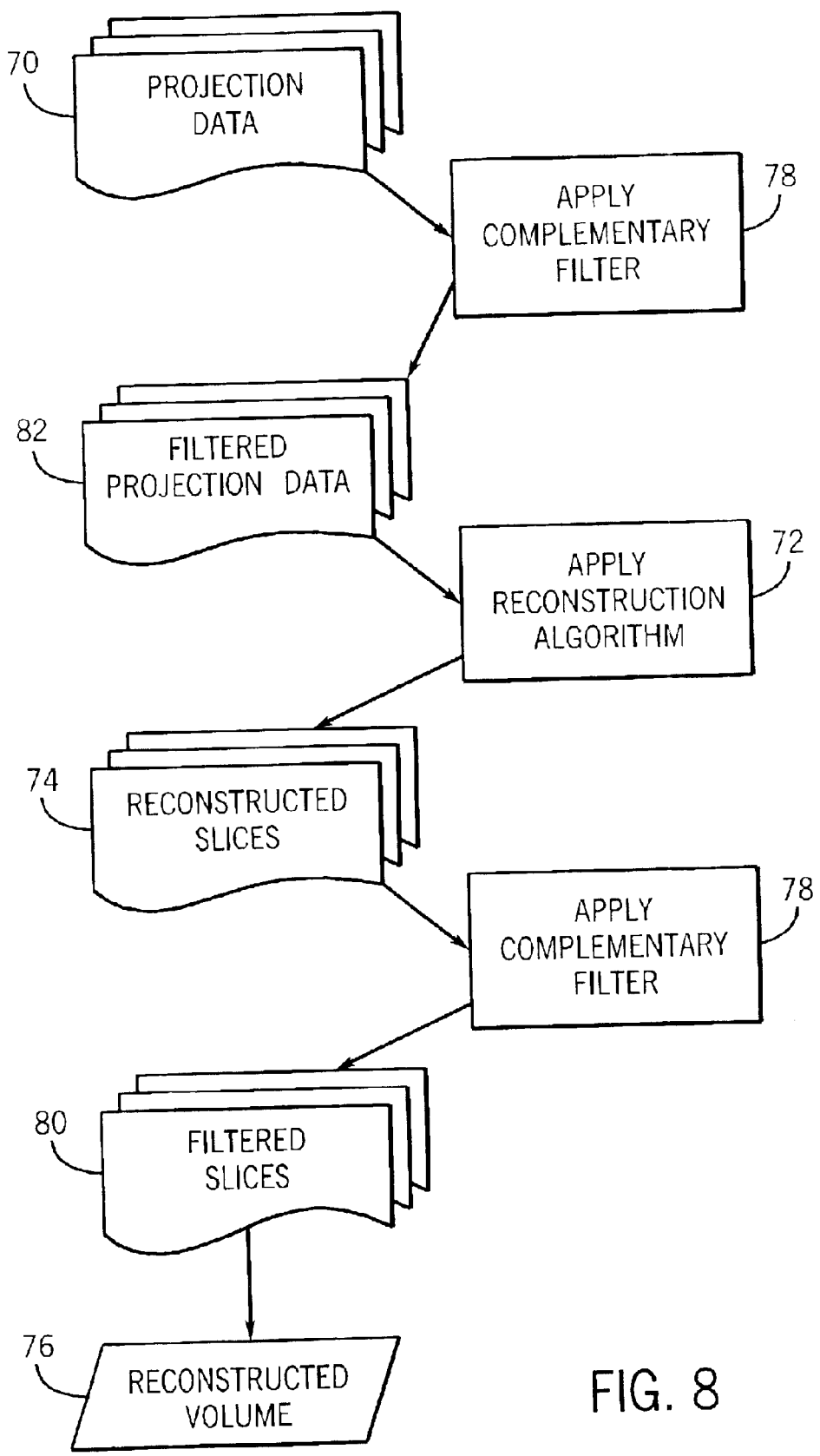
FIG. 8 is a state transition diagram depicting the formation of a reconstructed image volume from projection data according to yet another embodiment of the present technique.

If, however, the reconstruction process or the complementary filtering process are non-linear or non-additive, the order in which the complementary filter is applied 78 and the reconstruction algorithm is applied 72 is selected accordingly. In addition, in such non-linear reconstructions, there may be advantages to applying a complementary filter both to the projection data 70 and the reconstructed slices 74, as depicted in FIG. 8. In such instances the application of the complementary filter 78 may be split between the two applications, or separate complementary filters may be applied in each instance to achieve the desired contrast symmetry in the filtered slices 80.

The application of a complementary filter, whether by the techniques discussed in regard to FIG. 6, 7, or 8, provides a mechanism for correcting the orientation specific contrast variations attributable to the reconstruction algorithm or other factors. These techniques may be used in conjunction with linear or elongated scan paths 56 to introduce contrast symmetry into the final image, thereby improving the diagnostic value of the image. In addition, it is not necessary that the source 12 move to produce the contrast asymmetries addressed. Indeed, the patient 18 or the detector 22 may instead be moved relative to the source 12. The discussed techniques are also applicable in situations in which the patient 18 or detector 22 are moved to produce the noted asymmetries. While the techniques have been discussed in the context of medical imaging, other fields such as non-destructive evaluation and testing or other non-invasive imaging situations may also utilize these techniques. Indeed, the described techniques may be applicable in any situation where the goal is to reconstruct three-dimensional information about an imaged object from projection radiographs.

The invention may be susceptible to various modifications and alternative forms, and specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing radiographic image data, comprising:
    moving a radiation source relative to an imaged object to obtain two or more radiographic projections of the imaged object at two or more corresponding view angles;
    filtering the radiographic projections in a direction generally transverse to a scan path of the radiation source; and
    applying a reconstruction algorithm to the filtered projections to reconstruct one or more reconstructed slices.

2. The method as recited in claim 1, wherein the reconstruction algorithm utilizes a re-projection consistency constraint.

3. The method as recited in claim 1, wherein filtering the radiographic projections comprises applying a complementary filter to the radiographic projections.

4. The method as recited in claim 3, wherein the complementary filter comprises at least one of a linear filter, a non-linear filter, and a multi-scale method based filter.

5. The method as recited in claim 3, wherein the complementary filter comprises a high-pass filter.

6. The method as recited in claim 1, wherein filtering the two or more radiographic projections comprises selecting a filter having a desired characteristic adapted to an apparent filtering effect produced by the reconstruction algorithm.

7. The method as recited in claim 1, wherein filtering the two or more radiographic projections comprises selecting a filter which, in conjunction with an apparent filtering effect produced by the reconstruction algorithm, reduces an orientation dependent contrast variation associated with a reconstructed structure in the one or more reconstructed slices.

8. The method as recited in claim 1, wherein filtering the two or more radiographic projections comprises selecting a filter which, in conjunction with an apparent filtering effect produced by the reconstruction algorithm, produces a rotationally symmetric filtering effect in the one or more reconstructed slices.

9. The method as recited in claim 1, further comprising filtering the one or more reconstructed slices in a direction transverse to the scan path of the radiation source.

10. The method as recited in claim 9, wherein filtering the one or more reconstructed slices comprises applying a complementary filter to the reconstructed slices.

11. A method for processing radiographic image data, comprising:
    moving a radiation source relative to an imaged object to obtain two or more radiographic projections of the imaged object at two or more corresponding view angles;
    applying a reconstruction algorithm to the radiographic projections to reconstruct one or more image slices; and
    filtering the image slices in a direction transverse to a scan path of the radiation source.

12. The method as recited in claim 11, wherein the reconstruction algorithm utilizes a re-projection consistency constraint.

13. The method as recited in claim 11, wherein filtering the image slices comprises applying a complementary filter to the image slices.

14. The method as recited in claim 13 wherein applying the complementary filter comprises at least one of a linear filter, a non-linear filter, and a multi-scale method based filter.

15. The method as recited in claim 13, wherein the complementary filter comprises a high-pass filter.

16. The method as recited in claim 11, wherein filtering the image slices comprises selecting a filter having a desired characteristic adapted to an apparent filtering effect produced by the reconstruction algorithm.

17. The method as recited in claim 11, wherein filtering the image slices comprises selecting a filter which, in conjunction with an apparent filtering effect produced by the reconstruction algorithm, reduces an orientation dependent contrast variation associated with a reconstructed structure in the filtered image slices.

18. The method as recited in claim 11, wherein filtering the image slices comprises selecting a filter which, in conjunction with an apparent filtering effect produced by the reconstruction algorithm, produces a rotationally symmetric filtering effect in the filtered image slices.

19. The method as recited in claim 11, farther comprising filtering the two or more radiographic projections in a direction transverse to the scan path of the radiation source.

20. The method as recited in claim 19, wherein filtering the two or more radiographic projections comprises applying a complementary filter to the two or more radiographic projections.

21. A system for processing radiographic image data, comprising:
    a radiation source capable of producing a stream of radiation;
    a control circuit operably coupled to the radiation source;
    a detector capable of detecting the stream of radiation and generating two or more radiographic projections;
    a motor controller configured to displace at least one of the radiation source, the detector, and a patient platform;
    a processing circuit operably coupled to the detector configured to receive the two or more radiographic projections and to reconstruct the two or more radiographic projections to form one or more reconstructed slices representative of one or more structures within an imaged volume, wherein the processing circuit applies at least one complementary filter to at least one of the two or more radiographic projections and the one or more reconstructed slices in a direction generally transverse to a scan path of the radiation source; and an operator workstation operably couple to the processing circuit configured to display the one or more reconstructed slices.

22. The system as recited in claim 21, wherein the processing circuit applies a reconstruction algorithm utilizing a re-projection consistency constraint to reconstruct the two or more radiographic projections.

23. The system as recited in claim 21, wherein the filter comprises at least one of a linear filter, a non-linear filter, and a multi-scale method based filter.

24. The system as recited in claim 21, wherein the filter comprises a high-pass filter.

25. The system as recited in claim 21, wherein the filter has a characteristic adapted to an apparent filtering effect produced by a reconstruction algorithm used to reconstruct the two or more radiographic projections.

26. The system as recited in claim 21, wherein the filter produces a rotationally symmetric filtering effect in conjunction with an apparent filtering effect produced by reconstructing the two or more radiographic projections.

27. The system as recited in claim 21, wherein a contrast variation of the one or more reconstructed slices attributable to the orientation of the imaged structures is reduced.

28. A system for processing radiographic image data, comprising:

a radiation source capable of producing a stream of radiation;

a control circuit operably coupled to the radiation source;

a detector capable of detecting the stream of radiation and generating two or more radiographic projections;

a motor controller configured to displace at least one of the radiation source, the detector, and a patient platform;

a processing circuit operably coupled to the detector configured to receive the two or more radiographic projections and to reconstruct the two or more radiographic projections to form one or more reconstructed slices representative of one or more structures within an imaged volume, wherein the processing circuit comprises a means for reducing contrast asymmetry in the one or more reconstructed slices; and an operator workstation operably couple to the processing circuit configured to display the one or more reconstructed slices.

29. A tangible medium for processing radiographic image data, comprising:

a routine for filtering two or more radiographic projections in a direction generally transverse to a scan path of a radiation source used to generate the projections; and a routine for applying a reconstruction algorithm to the filtered projections to generate one or more reconstructed slices.

30. The tangible medium as recited in claim 29, wherein the reconstruction algorithm utilizes a re-projection consistency constraint.

31. The tangible medium as recited in claim 29, wherein the routine for filtering the two or more radiographic projections applies a complementary filter to the radiographic projections.

32. The tangible medium as recited in claim 31, wherein the complementary filter comprises at least one of a linear filter, a non-linear filter and a multi-scale method based filter.

33. The tangible medium as recited in claim 31, wherein the complementary filter comprises a high-pass filter.

34. The tangible medium as recited in claim 29, wherein the routine for filtering the two or more radiographic projections applies a filter having a desired characteristic adapted to an apparent filtering effect produced by the reconstruction algorithm.

35. The tangible medium as recited in claim 29, wherein the routine for filtering the two or more radiographic projections applies a filter which, in conjunction with an apparent filtering effect produced by the reconstruction algorithm, reduces orientation dependent contrast variations associated with one or more reconstructed structures in the one or more reconstructed slices.

36. The tangible medium as recited in claim 29, wherein the routine for filtering the two or more radiographic projections applies a filter which, in conjunction with an apparent filtering effect produced by the reconstruction algorithm, produces a rotationally symmetric filtering effect in the one or more reconstructed slices.

37. The tangible medium as recited in claim 29, further comprising a routine for filtering the one or more reconstructed slices in a direction transverse to the scan path of the radiation source.

38. The tangible medium as recited in claim 37, wherein filtering the one or more reconstructed slices comprises applying a complementary filter to the one or more reconstructed slices.

39. A tangible medium for processing radiographic image data, comprising:

a routine for applying a reconstruction algorithm to two or more radiographic projections to generate one or more reconstructed slices; and a routine for filtering the one or more reconstructed slices in a direction generally transverse to a scan path of the radiation source used to generate the projections.

40. The tangible medium as recited in claim 39, wherein the routine for applying a reconstruction algorithm utilizes a re-projection consistency constraint.

41. The tangible medium as recited in claim 39, wherein the routine for filtering the one or more reconstructed slices applies a complementary filter to the reconstructed slices.

42. The tangible medium as recited in claim 41, wherein the complementary filter comprises at least one of a linear filter, a non-linear filter, and a multi-scale method based filter.

43. The tangible medium as recited in claim 41, wherein the complementary filter comprises a high-pass filter.

44. The tangible medium as recited in claim 39, wherein the routine for filtering the image slices applies a filter having a desired characteristic adapted to an apparent filtering effect produced by the reconstruction algorithm.

45. The tangible medium as recited in claim 39, wherein the routine for filtering the reconstructed slices applies a filter which, in conjunction with an apparent filtering effect produced by the reconstruction algorithm, reduces orientation dependent contrast variations associated with one or more reconstructed structures in the filtered reconstructed slices.

46. The tangible medium as recited in claim 39, wherein the routine for filtering the reconstructed slices applies a filter which, in conjunction with an apparent filtering effect produced by the reconstruction algorithm, produces a rotationally symmetric filtering effect in the filtered reconstructed slices.

47. The tangible medium as recited in claim 39, further comprising a routine for filtering the two or more radiographic projections in a direction transverse, to the scan path of the radiation source.

48. The tangible medium as recited in claim 47, wherein filtering the two or more radiographic projections comprises applying a complementary filter to the two or more radiographic projections.

49. A method for processing radiographic image data, comprising:

moving a radiation source relative to an imaged object to obtain two or more radiographic projections of the imaged object at two or more corresponding view angles;

applying a reconstruction algorithm to the radiographic projections to reconstruct one or more reconstructed slices, wherein applying the reconstruction algorithm comprises applying a complementary filter to the radiographic projections in a direction generally transverse to a scan path of the radiation source.

50. The method as recited in claim 49, wherein the complemenary filter comprises a high-pass filter.

51. The method as recited in claim 49, wherein applying the complementary filter to the radiographic projections comprises selecting the complementary filter which, in conjunction with an apparent filtering effect produced by the reconstruction algorithm, reduces an orientation dependent contrast variation associated with a reconstructed structure in the one or more reconstructed slices.

52. The method as recited in claim 49, wherein applying the complementary filter to the radiographic projections comprises selecting the complementary filter which, in conjunction with an apparent filtering effect produced by the reconstruction algorithm, produces a rotationally symmetric filtering effect in the one or more reconstructed slices.

53. A system for processing radiographic image data, comprising:

a radiation source capable of producing a stream of radiation;

a control circuit operably coupled to the radiation source;

a detector capable of detecting the stream of radiation and generating two or more radiographic projections;

a motor controller configured to displace at least one of the radiation source, the detector, and a patient platform;

a processing circuit operably coupled to the detector configured to apply a reconstruction algorithm to the two or more radiographic projections to reconstruct one or more reconstructed slices representative of one or more structures within an imaged volume, wherein the reconstruction algorithm comprises a complementary filter which filters the radiographic projections in a direction generally transverse to a scan path of the radiation source; and an operator workstation operably couple to the processing circuit configured to display the one or more reconstructed slices.

54. The system as recited in claim 53, wherein the complementary filter comprises a high-pass filter.

55. The system as recited in claim 53, wherein the filter produces a rotationally symmetric filtering effect in conjunction with an apparent filtering effect produced by reconstructing the two or more radiographic projections.

56. The system as recited in claim 53, wherein a contrast variation of the one or more reconstructed slices attributable to the orientation of the imaged structures is reduced.

57. A tangible medium for processing radiographic image data, comprising:

a routine for applying a reconstruction algorithm to two or more radiographic projections to reconstruct one or more reconstructed slices, wherein the two or more radiographic projections are obtained at different view angles relative to an imaged object and wherein applying the reconstruction algorithm comprises applying a complementary filter to the radiographic projections in a direction generally transverse to a scan path of the radiation source.

58. The tangible medium as recited in claim 57, wherein the complementary filter comprises a high-pass filter.

59. The tangible medium as recited in claim 57, wherein the routine for applying a reconstruction algorithm to two or more radiographic projections applies a complementary filter which, in conjunction with an apparent filtering effect produced by the reconstruction algorithm, reduces orientation dependent contrast variations associated with one or more reconstructed structures in the one or more reconstructed slices.

60. The tangible medium as recited in claim 57, wherein the routine for applying a reconstruction algorithm to two or more radiographic projections applies a complementary filter which, in conjunction with an apparent filtering effect produced by the reconstruction algorithm, produces a rotationally symmetric filtering effect in the one or more reconstructed slices.

\* \* \* \* \*